United States Patent
Park et al.

(10) Patent No.: US 7,050,366 B2
(45) Date of Patent: May 23, 2006

(54) DEVICE AND METHOD FOR DETECTING NON-WRITABLE REGION OF OPTICAL RECORDING MEDIUM

(75) Inventors: Sang On Park, Kyonggi-do (KR); You Jae Park, Seoul (KR); Eung Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 19 days.

(21) Appl. No.: 10/623,653

(22) Filed: Jul. 22, 2003

(65) Prior Publication Data

US 2004/0130981 A1 Jul. 8, 2004

Related U.S. Application Data

(63) Continuation of application No. 09/577,825, filed on May 25, 2000, now Pat. No. 6,614,740.

(30) Foreign Application Priority Data

May 25, 1999 (KR) ........................................ 1999-18901
Jul. 21, 1999 (KR) ........................................ 1999-29574

(51) Int. Cl.
*G11B 7/00* (2006.01)

(52) U.S. Cl. ............... 369/44.41; 369/44.25; 369/47.1; 369/124.01

(58) Field of Classification Search ............... 369/47.1, 369/53.1, 53.2, 53.37, 59.1, 59.17, 59.18, 369/59.21, 124.01, 124.15, 44.34, 44.41, 369/44.25
See application file for complete search history.

(56) References Cited

U.S. PATENT DOCUMENTS

| 5,959,943 A | * | 9/1999 | Yonezawa et al. | ....... 369/13.35 |
| 6,614,740 B1 | * | 9/2003 | Park et al. | ............... 369/59.17 |

FOREIGN PATENT DOCUMENTS

| JP | 06-176376 | 6/1994 |
| JP | 07-326158 | 12/1995 |
| JP | 09-293244 | 11/1997 |
| JP | 10-275338 | 10/1998 |
| JP | 2000-173059 | 6/2000 |

* cited by examiner

*Primary Examiner*—Muhammad Edun
(74) *Attorney, Agent, or Firm*—Birch Stewart Kolasch & Birch LLP

(57) ABSTRACT

Device and method for detecting a non-writable region of an optical recording medium, wherein a read channel 1 signal and a read channel 2 signal are sliced at respective slice levels to produce header mask signals, and a header region which is a non-writable region is determined for the header mask signal taking the slice levels and written/unwritten regions ion the disk, whereby permitting stabilization of servos because servo error signals, such as a tracking error signal, and a focus error signal can be held exactly at a header region even if the servos are not stable, that prevents deterioration of a data quality in writing and reading, and permitting to shift an optical pickup to a desired position and accurate measurement of an amount of eccentricity because there is no influence of the header in a track jump and a disk eccentricity measurement.

21 Claims, 13 Drawing Sheets

DEVICE AND METHOD FOR DETECTING NON-WRITABLE REGION OF OPTICAL RECORDING MEDIUM

This application is a continuation of Application No. 09/577,825, filed on May 25, 2000 now U.S. Pat. No. 6,614,740, the entire contents of which are hereby incorporated by reference and for which priority is claimed under 35 U.S.C. §120; and this application claims priority of Application No. P1999-18901 filed in Korea on May 25, 1999 and Application No. P1999-29574 filed in Korea on Jul. 21, 1999 under 35 U.S.C. §119.

BACKGROUND OF THE INVENTION

1. Field of the Invention

The present invention relates to an optical recording medium, and more particularly, to device and method for detecting a non-writable region of an optical recording medium.

2. Background of the Related Art

In general, in optical recording media which permit repeated rewriting without restriction, such as optical disks, there are Rewritable Compact Disc(CD-RW), Rewritable Digital Versatile Disc(DVD-RW, DVD-RAM, DVD+RW), and the like. The rewritable optical recording medium, particularly, the DVD-RAM is provided with a signal track having a land and a groove, and information is recorded on the land and the groove for increasing a recording density, respectively. And, for this, an optical pickup is provided with a writing/reading laser beam with a short wavelength, and an objective lens provided for collecting lights has a great numerical aperture for making the writing/reading laser beam smaller.

FIG. 1 illustrates a block diagram of a related art rewritable optical disk recording/reproducing device. The optical disk 101 has a land and a groove, for recording data on, and reading data from both of them.

An optical pickup 102 causes a beam collected by an objective lens to be focused onto a signal track of the optical disk 101 under the control of a servo controller 107, and directs a beam, reflected at a signal recording surface and collected by the objective lens, to an optical detector for detecting a focus error signal and a tracking error signal. The optical detector has a plurality of optical detecting elements, for providing an electrical signal proportional to an amount of light obtained from each optical element to a RF and servo error generator 105. As shown in FIG. 2, if the optical detector is divided into a specific number, i.e. four, in a signal track direction and a radial direction to have four optical detecting elements PDA, PDB, PDC, and PDD, the optical detector provides electrical signals a, b, c, d each proportional to an amount of light obtained in respective optical detecting elements PDA, PDB, PDC, and PDD to the RF and servo error generator 105. Then, the RF and servo error generator 105 combines the electrical signals a, b, c, and d to produce a read channel 1 signal required for data reading, a read channel 2 signal required for servo control, and a focus error signal FE, and the like. The read channel 1 signal is obtained by a+b+c+d, the read channel 2 signal is obtained by (a+b)−(c+d), and the tracking error signal TE is obtained by processing the read channel 2 signal. If it is a case when the optical detector is divided into two in the track direction, from a light amount balance of the two photodiodes I1 and I2, the read channel 1 signal(=I1+I2) and the read channel 2 signal(=I1−I2) is detected. That is, the (a+d) in FIG. 2 corresponds to I1, and the (b+c) in FIG. 2 corresponds to I2. The read channel 1 signal is provided to a data decoder 106 for reading, servo error signals, such as FE and TE, are provided to the servo controller 107, and a control signal for data writing is provided to an encoder 103. The encoder 103 encodes a data to be written into a writing pulse of a format required by the optical disk 101 and provides to an LD driver 104, and the LD driver 104 drives an LD in the optical pickup 102 in a power corresponding to the writing pulse, thereby writing the data on the optical disk 101. And, in reading the data written on the optical disk 101, the data decoder 106 restores an original form of the data from the read channel 1 signal detected form the RF and servo error generator 105. And, the servo controller 107 processes a focus error signal FE to provide a driving signal for focusing control to a focus servo driver 108, and processes a tracking error TE signal, to provide a driving signal for tracking control to a tracking servo driver 109. In this instance, the focus servo driver 108 drives the focus actuator in the optical pickup 102 to move the optical pickup 102 in up and down direction to follow the up and down movement of the optical disk 101 as the optical disk 101 is rotated. That is, the focus actuator for driving the objective lens, which collects lights, in a focusing axis maintains a distance between the objective lens and the optical disk 101 in response to a focus control signal. And, the tracking servo driver 109 drives a tracking actuator in the optical pickup 102, to shift the objective lens in the optical pickup 102 in a radial direction, for correcting a position of beam to follow the track.

In the meantime, in a case of the rewritable disk 101, as there is no information recorded on an initial disk, controlling and writing the disk is not possible. For this, disk tracks are provided to the land and the groove, information is written along the tracks, and control information for sector addresses, random access, rotation control and the like is written on the disk separately, to make tracking control available even for an empty disk having no information signal written thereon. The control information may be written in a header region by preformatting a header region at beginning of every sector. The header region preformatted at beginning of each sector is, in turn, provided with four header fields(header 1 field~header 4 field). And, the header 1 and 2 fields and the header 3 and 4 fields are arranged to alternate the other with reference to the track center. FIG. 3 illustrates one example, wherein a header field structure for a first sector on one track is shown. However, the foregoing header structure has a bad influence in producing the servo error signal, such as a tracking error signal, and a focus error signal, actually. That is, the servo error signal read from the header region is distorted depending on a header structure, and is difficult to control. Therefore, in a case of DVD-RAM, in for generating, and making a stable control of a servo error, the servo error signal is held in controlling a servo in the header region for reducing an influence from the header. To do this, a method for identifying a header region is required, for which the read channel 2 signal is used in the related art.

That is, FIG. 4 illustrates a related art block diagram for detecting a header region, including an LPF(Low Pass Filter) 201 for receiving the read channel 2 signal and making low pass filtering, a first comparator 202 for providing an IP1 signal if the low pass filtered read channel 2 signal is higher than a preset slice level, a second comparator 203 for providing an IP2 signal if the low pass filtered read channel 2 signal is lower than the preset slice level, and a signal generator 204 for generating a header mask signal which represents a header region by using the IP1 and IP2 signal from the first and second comparators 202 and 203.

In the foregoing FIG. 4, the LPF 201 receives the read channel 2 signal from the RF and servo error generator 105, subjects to low pass filtering to produce a tracking error signal TE, and provides to the first and second comparators 202 and 203. As the header region, i.e., the header 1, 2 fields and the header 3, 4 fields are alternates with reference to a track center, the read channel 2 signal detected at the header 1, 2 fields and the header 3, 4 fields have phases(i.e., slopes) opposite to each other as shown in FIG. 5A. If such a read channel 2 signal in the header region passes through the LPF 201, the read channel 2 signal becomes a tracking error signal TE from which a noise is removed, as shown in FIG. 5. In this instance, as shown in FIG. 5C, if the tracking error signal TE provided to a plus terminal is higher than a slice level provided to a minus terminal, the first comparator 202 provides an IP1 signal, and, as shown in FIG. 5D, if the tracking error signal TE provided to the minus terminal is lower than the slice level provided to the plus terminal, the second comparator 203 provides an IP2 signal. Herein, it is assumed that a TZC(Tracking Zero Cross) position is set at the slice level.

In the meantime, phases of the IP1 and IP2 signals like FIGS. 5C and 5D differ depending on the track following at the present time being a land or groove. A sum of the IP1 and IP2 signals at the signal generator 204 produces the header region as shown in FIG. 5E. Therefore, respective servo error signals are held in the header region by using a signal as shown in FIG. 5E as a header mask signal which represents a header region, for reducing an influence from the header.

In the meantime, the read channel 2 signal as shown in FIG. 5A is one detected in a state the servos are stable, i.e., both the tracking servo and the focus servo are turned on. If it is a state the tracking servo is turned off, for example, either the traverse or the free running, when the servo is unstable, the IP1 or IP2 signal is not detected well, as well as the header region, too. In a traverse state which is mainly used in a seek, the tracking servo is turned off and the focus servo only is turned on, and the disk is rotated and the optical pickup is moved, for detecting the servo error signal. And, in the free running state which is mainly used for measuring an amount of eccentricity of the disk, the tracking servo is turned off and the focus servo only is turned on, and the disk is rotated and the optical pickup is fixed, for detecting a servo error. However, as described, if the header region is not detected properly, the servo error signal is affected by the header because the servo error signal can not be held at the header region. That is, provided that the IP1 and IP2 signals are produced from the read channel 2 signal, and used as signals for holding the header region, there are distortions occurred in servo error signals, such as focus error signal and tracking error signal, caused by a bad influence from the header in a traverse for seeking or in a free running for measurement of an amount of eccentricity.

FIG. 6A illustrates a read channel 2 signal detected from a data writable sector and a header region which informs a sector position, and FIG. 6B illustrates a TZC signal produced by slicing the read channel 2 signal at a TZC position, showing an example of the influence from the header.

Referring to FIG. 6A, the sinusoidal wave form is the read channel 2 signal detected at the data writable region, such as a sector, and the impulse form is the read channel 2 signal detected at a header region. As the header region is very short compared to the sector, a pulse width of the read channel 2 signal detected at the header region is significantly smaller than the same of the sector. In FIG. 6B, portions affected by the header are shown in circles. That is, the circled portions illustrate cases when detection of the header regions are not possible, with subsequent failure of holding the servo error signal, and occurrence of more pulses. In this instance, if a number of a TZC signal pulses are counted, a number of tracks passed can be known, permitting to know the present position of the optical pickup in a case of traverse, and to measure an amount of eccentricity of the disk in a case of free running.

However, the improper detection of the header region in the related art, that causes occurrence of more pulses of the TZC signal by the influence from the header as shown in FIG. 6B, results in the following problems.

First, the failure of holding the servo error signals, such as the tracking error or the focus error at the header region causes deterioration of a data quality in writing/reading.

Second, the more of pulses compared to a regular case in measurement of eccentricity leads to misunderstanding that the eccentricity is greater than fact, that gives a bad influence to the servos.

Third, because the optical pickup fails to reach to a desired position, the seek is slow and the servos are unstable. For example, though the optical pickup is required to advance 10 tracks, the optical pickup is misunderstood that the advance of 10 tracks is already made even if an advance of only 8 track is made due to the influence from the header, to stop movement of the optical pickup at the 8 tracks.

Fourth, though a tracking servo turn on should be made at a region other than the header region in a seek as the header region is a point disturbance comes in, the improper detection of the header region may leads to a tracking servo turn on at the header region, to cause the servo unstable, too.

Fifth, the lands and grooves are required to be switched for matching to a writing power, an offset and the like properly after the lands and grooves are determined as the lands and grooves have different recording powers, focus offsets, and tracking offsets, and opposite tracking error signals. If a number of the header are counted, the lands/grooves can be determined, and switching can be made. However, the improper detection of the header region in the related art impedes an exact switching of the lands/grooves.

SUMMARY OF THE INVENTION

Accordingly, the present invention is directed to device and method for detecting a non-writable region of an optical recording medium that substantially obviates one or more of the problems due to limitations and disadvantages of the related art.

An object of the present invention is to provide device and method for detecting a non-writable region of an optical recording medium, in which a read channel 1 signal is used for detecting a header region.

Other object of the present invention is to provide device and method for detecting a non-writable region of an optical recording medium, in which a read channel 1 signal and a read channel 2 signal are sliced at respective slice levels, to produce header mask signals, for selective application depending on writable/non-writable regions.

Another object of the present invention is to provide device and method for detecting a non-writable region of an optical recording medium, in which a slice level is adjusted, to detect a header mask signal from the read channel 1 or read channel 2 signal, for applying to writable/non-writable regions in the same fashion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for detecting a non-writable region of an optical recording medium includes the steps of (1) obtaining a sum of optical signals ABSTRACT reflected at the optical recording medium, and (2) comparing the summed signal to a fixed reference value to determined a region thereof as a non-writable region if the summed signal is higher than the fixed reference value.

The step (2) includes the step of producing a TZC (Tracking Zero Crossing) signal having an influence of the non-writing region removed therefrom, when the non-writable region is detected.

The step (2) further includes the step of counting a number of pulses of the TZC signal, for carrying out a track jump.

The step (2) further includes the step of counting a number of pulses of the TZC signal, for measuring an eccentricity of the optical recording medium.

The step (2) further includes the step of holding a servo error signal for carrying out a servo control if a point of the optical recording medium being written or read at the present time is determined to be a non-writable region.

The step (2) further includes the steps of counting a number of the determined non-writable regions, to determine the present track of being a land track or a groove track, and carrying out land/groove switching depending on a result of the determination.

In other aspect of the present invention, there is provide a method for detecting a non-writable region of an optical recording medium including the steps of (1) obtaining a difference of optical signals reflected at the optical recording medium, a tracking error signal, for high pass filtering the tracking error signal, and (2) signal shaping a high pass filtered value, to determine a region thereof as the non-writable region if the signal shaped value is greater than a fixed reference value.

In another aspect of the present invention, there is provided a method for detecting a non-writable region of an optical recording medium including the steps of (1) obtaining a sum of optical signals reflected at the optical recording medium, for low pass filtering the optical signals, (2) providing a first non-writable region detecting signal if the low pass filtered value is greater than a first reference value, (3) obtaining a difference of optical signals reflected at the optical recording medium, a tracking error signal, for high pass filtering the tracking error signal, (4) signal shaping a high pass filtered value, to provide a second non-writable region detecting signal if the signal shaped value is greater than a second reference value, (5) determining the present region of being a written region or an unwritten region, and providing a result of the determination, and (6) producing and forwarding a final non-writable region detecting signal from the first non-writable region detecting signal and the second non-writable region detecting signal according to a result of the determination.

The step (5) includes the steps of obtaining a sum of optical signals reflected at the optical recording medium, and bottom holding the summed signal, and determining the present region as an unwritten region if the bottom held value is greater than a fixed reference value, and as a written region if the bottom held value is smaller than the fixed reference value, and forwarding a result of the determination.

The step (6) includes the step of providing a first non-writable region detecting signal as the final non-writable region detecting signal, which represents the non-writable region, if the present region is determined to be a written region, or providing a second non-writable region detecting signal as the final non-writable region detecting signal, if the present region is determined to be an unwritten region.

The method further includes the steps of changing the first reference value, determining a region as the non-writable region if a low pass filtered value thereof is greater than the changed first reference value, providing a non-writable region detecting signal, and applying the non-writable region detecting signal both to the written/unwritten regions.

The second non-writable region detecting signal is applied to the non-writable region detecting signal, for producing a final non-writable region detecting signal.

The method further includes the steps of changing the second reference value, determining a region as the non-writable region if the signal shaped value thereof is greater than the changed second reference value, providing a non-writable region detecting signal, and applying the non-writable region detecting signal both to the written/unwritten regions.

The first non-writable region detecting signal is applied to the non-writable region detecting signal, for producing a final non-writable region detecting signal.

In further aspect of the present invention, there is provided a method for detecting a non-writable region of an optical recording medium, including the steps of (1) obtaining a sum of optical signals reflected at the optical recording medium, for low pass filtering the optical signals, and providing a first non-writable region detecting signal if the low pass filtered value is greater than a first reference value, (2) obtaining a difference of optical signals reflected at the optical recording medium, a tracking error signal, for high pass filtering the tracking error signal, signal shaping the high pass filtered value, and providing a second non-writable region detecting signal if the signal shaped value is greater than a second reference value, (3) determining the non-writable region by using at least one of the first or second non-writable signals, (4) producing a track zero crossing signal which turns on/off at a zero cross time point of the difference signal of the optical signals, and (5) excluding a number of pulses counted in the non-writable region from a counted number of pulses of the tracking zero crossing.

In still further aspect of the present invention, there is provided a device for detecting a non-writable region of an optical recording medium including a first non-writable region detector for obtaining a sum of optical signals reflected at the optical recording medium for low pass filtering the optical signals, and providing a first non-writable region detecting signal if the low pass filtered value is greater than a first reference value, a second non-writable region detector for obtaining a difference of optical signals reflected at the optical recording medium, a tracking error signal, for high pass filtering the tracking error signal, signal shaping the high pass filtered value, and providing a second non-writable region detecting signal if the signal shaped value is greater than a second reference value, a writable region determiner for determining the present point of being a written region or unwritten region, and providing a result of the determination, and a non-writable region detecting signal generator for producing and forwarding a final non-writable region detecting signal from the first non-writable region detecting signal and the second non-writable region detecting signal according to a result of the determination.

The non-writable region detecting signal generator provides either the first non-writable region detecting signal as the final non-writable region detecting signal if the present point is determined to be the written region and the first and second reference values are fixed, or the second non-writable region detecting signal as the final non-writable region detecting signal if the present point is determined to be the unwritten region and the first and second reference values are fixed.

If the first reference value is changeable, the non-writable region detecting signal generator compares the changeable first reference value to the low pass filtered value, to produce the non-writable region detecting signal, and applying the non-writable region detecting signal both to the written/unwritten regions.

If the second reference value is changeable, the non-writable region detecting signal generator compares the changeable second reference value to the high pass filtered and signal shaped value, to produce the non-writable region detecting signal, and applying the non-writable region detecting signal both to the written/unwritten regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings. The present invention shows a method for detecting a header region, a non-writable region, in free running or traverse when servo(s) are unstable, for example, when a tracking servo is turned off, which will be explained by way of various embodiments. That is, in a first embodiment of the present invention, as a read channel 1 signal detected at a header region is always higher than a fixed level, a region is determined as the header region if the read channel 1 signal at the region is higher than the fixed slice level, for use in preventing the servo being influenced from the header. In the second embodiment of the present invention, a read channel 2 signal is high pass filtered, shaped, sliced at a fixed level, to determined a header region, for preventing the servo being influenced from the header. In the third embodiment of the present invention, a read channel 1 signal and a read channel 2 signal are respectively sliced at fixed slice levels, to detect header mask signals and apply selectively depending on a writable region and a non-writable region, for preventing the servo(s) from being influenced from the header. That is, the header mask signal detected by slicing the read channel 1 signal is applied at the writable region having a data written already, and the header mask signal detected by slicing the read channel 2 signal is applied at an unwritten region having no data written thereon even if the unwritten region is a writable region. And, in the fourth embodiment of the present invention, a header mask signal detected either by slicing a read channel 1 signal or read channel 2 signal at an adjusted slice level is applied both to a written region and an unwritten region. Or alternatively, header mask signals detected by slicing both the read channel 1 signal and the read channel 2 signal at respective adjusted slice levels may be compensated for each other, for application both to the written region and the unwritten region.

First Embodiment

Figure 1:
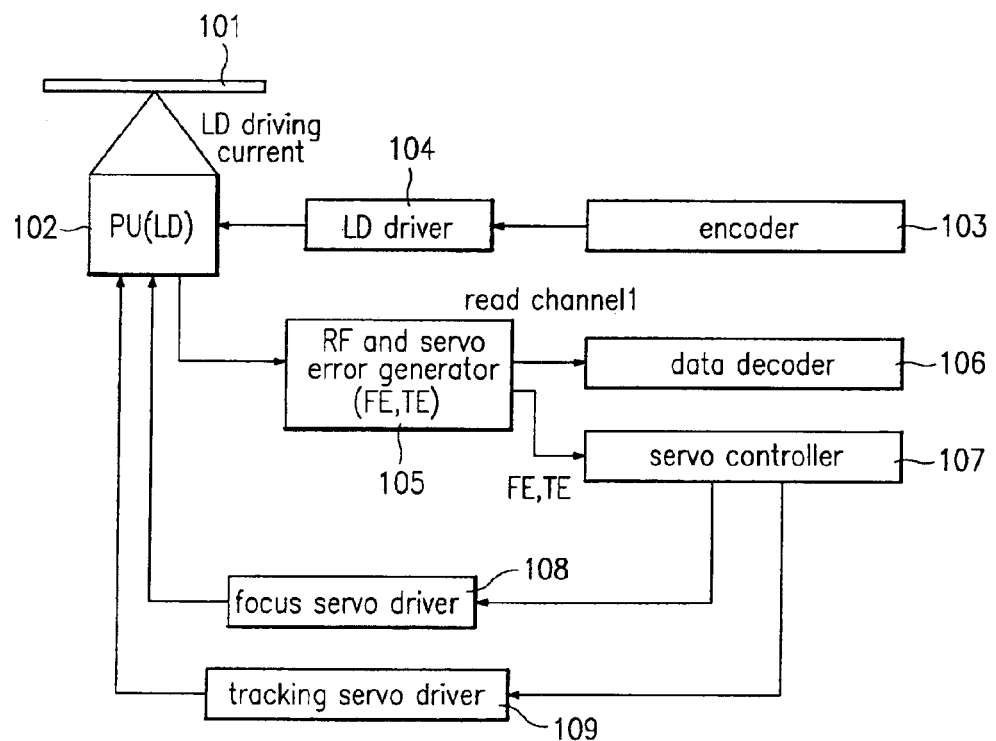
FIG. 1 illustrates a block diagram of a related art rewritable optical disk recording/reproducing device.
Figure 2:
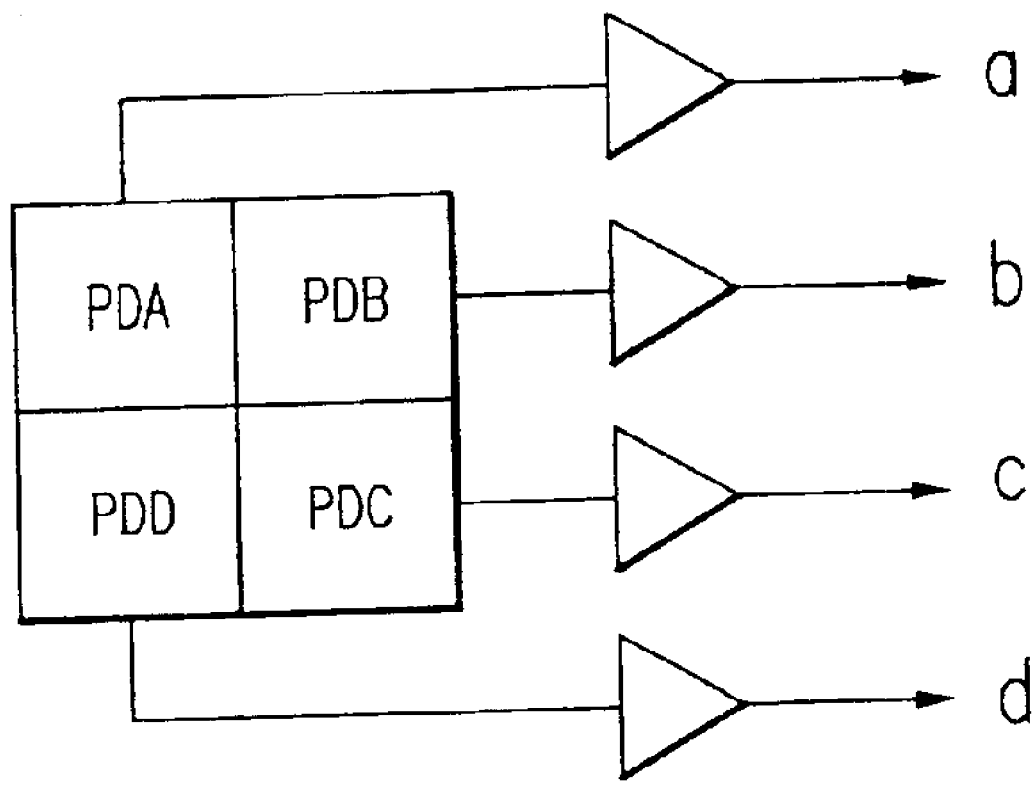
FIG. 2 illustrates one example of an optical detector in an optical pickup in FIG. 1.
Figure 3:
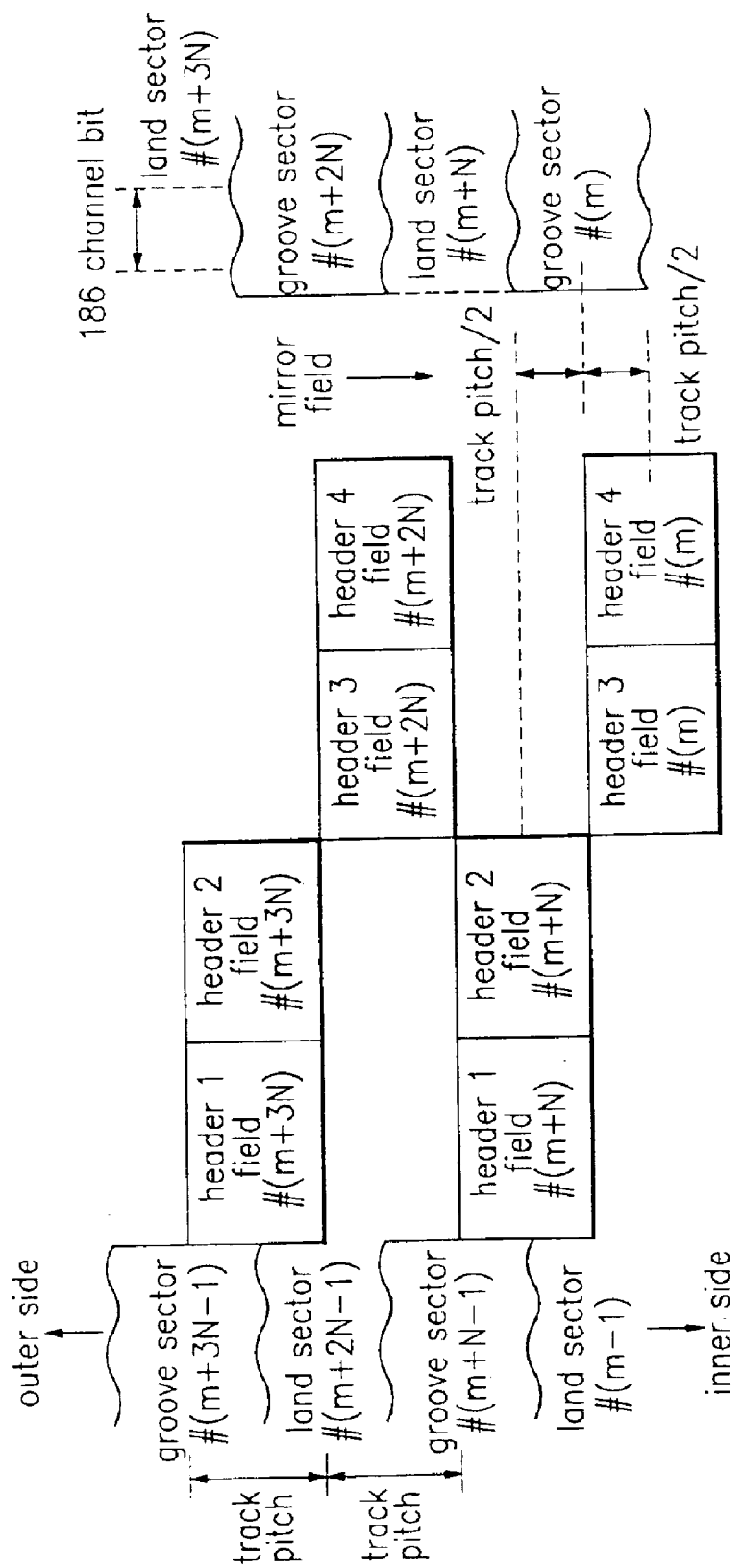
FIG. 3 illustrates an arrangement of headers each preformatted at a beginning of each sector of a rewritable disk in FIG. 1.
Figure 4:
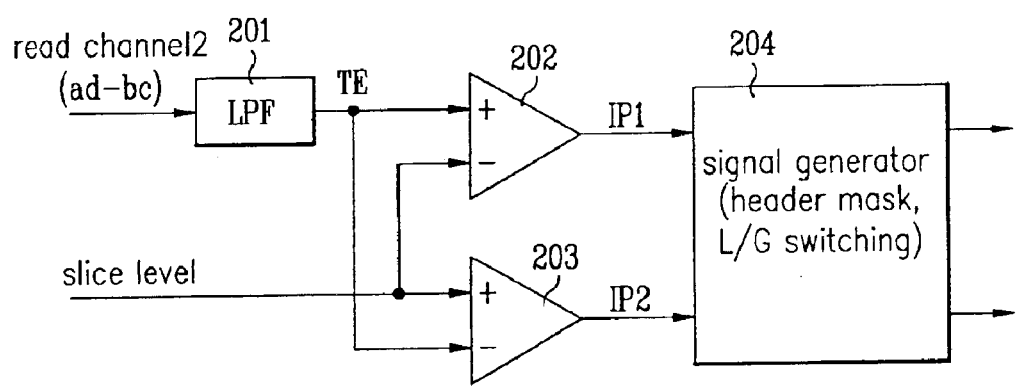
FIG. 4 illustrates a related art block diagram for detecting a non-writable region.
Figure 5:
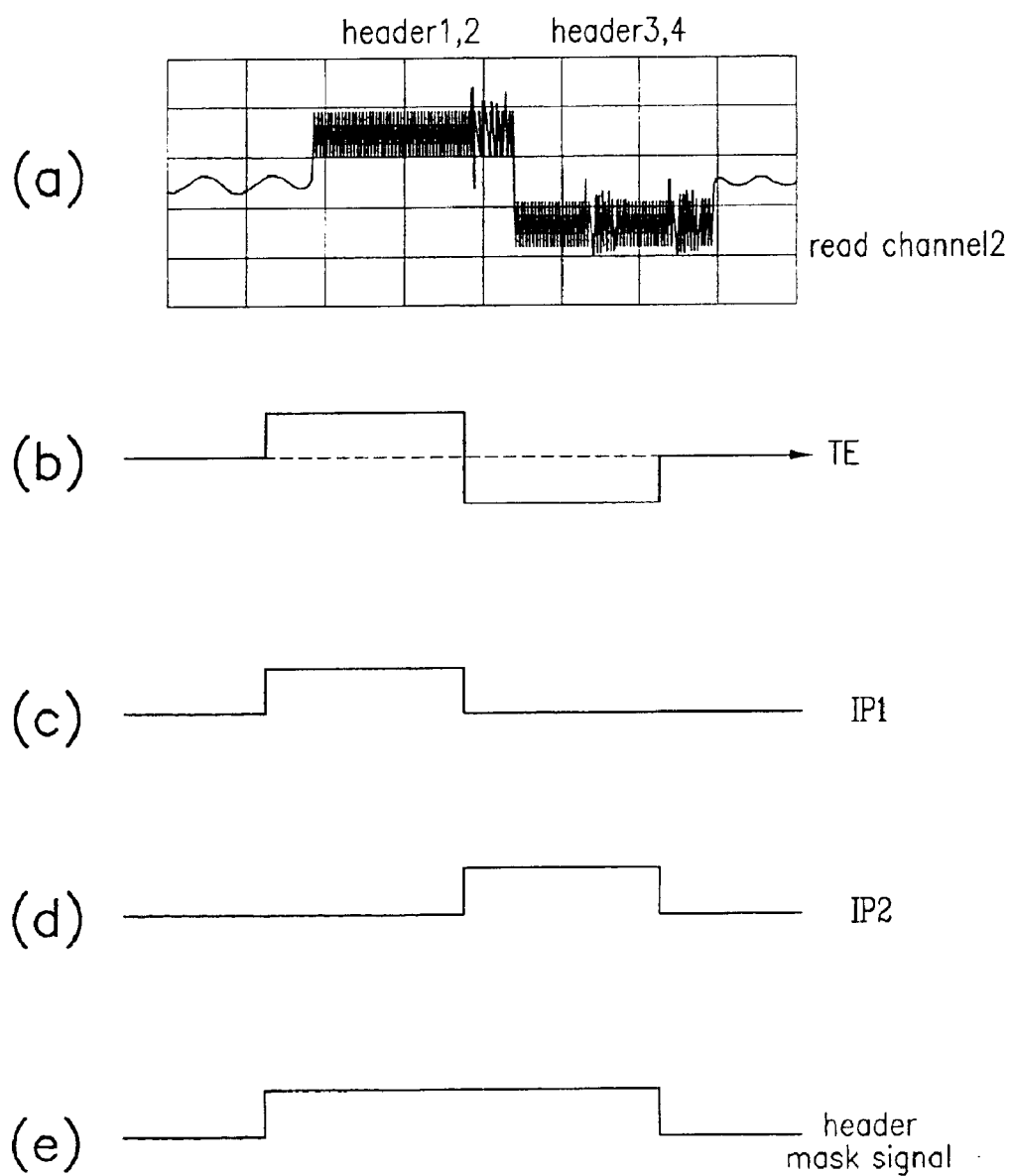
FIGS. 5A~5E illustrate waveforms showing a process for detecting a header region by using the read channel 2 signal in FIG. 4.
Figure 6:
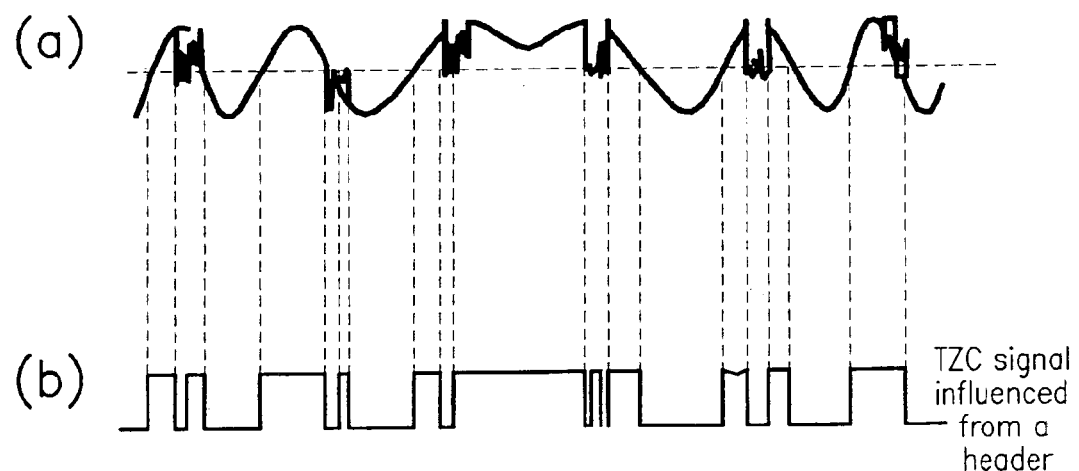
FIG. 6A illustrates a waveform of read channel 2 signal detected at a data writable sector and a header region.
FIG. 6B illustrates a waveform of a TZC signal produced by slicing the read channel 2 signal in FIG. 6a at a TZC position, showing an example of the influence from the header.
Figure 7:
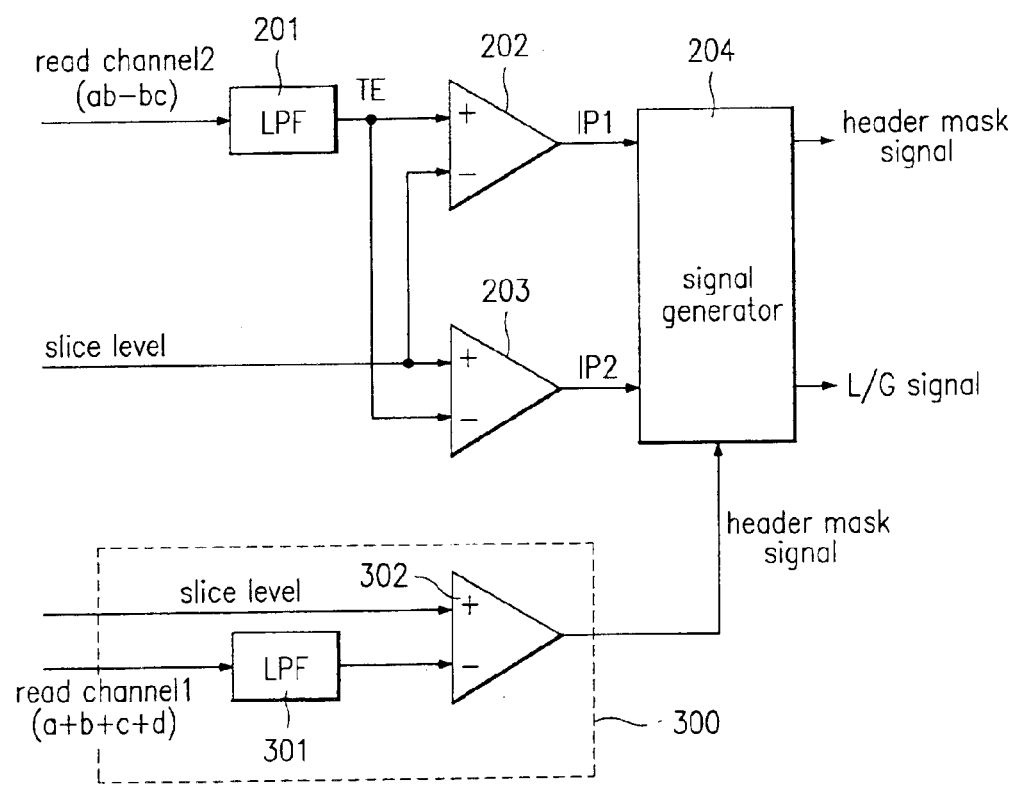
FIG. 7 illustrates a block diagram of a device for detecting a non-writable region of an optical recording medium in accordance with a first preferred embodiment of the present invention.
Figure 8:
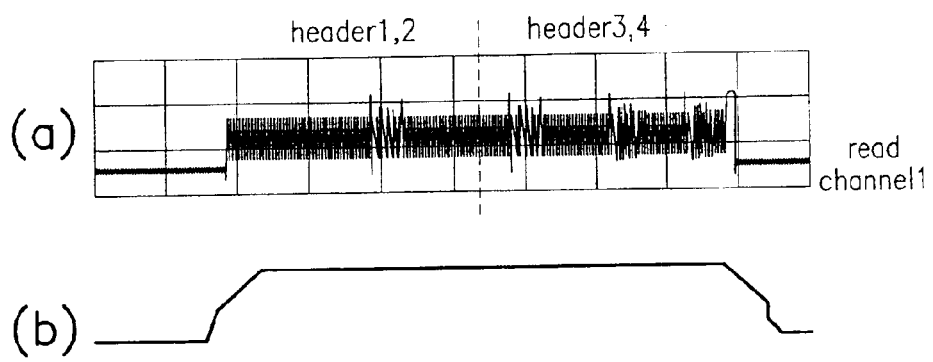
FIG. 8A illustrates a waveform of a read channel 1 signal detected at a header region.
FIG. 8B illustrates a waveform of a header mask signal detected from the read channel 1 signal in FIG. 8A.

FIG. 7 illustrates a block diagram of a device for detecting a non-writable region of an optical recording medium in accordance with a first preferred embodiment of the present invention, which is a system shown in FIG. 4, but further including a header detector 300 for detecting a header region by using a read channel 1. The header detector 300 includes an LPF 301 for receiving a read channel 1 signal and subjecting to low pass filtering, and a comparator 302 for comparing the low pass filtered read channel 1 signal at a preset slice level for generating a header mask signal and providing to a signal generator 204 if the low pass filtered read channel 1 signal is higher than the preset slice level. The slice level in slicing the read channel 2 signal is different from the slice level in slicing the read channel 1 signal. In the foregoing present invention, as shown in FIG. 8A, it can be known that the read channel 1 signal detected at the header region has phases identical at the header 1 and 2 fields, and the header 3 and 4 fields, and a peak value higher than a fixed level. Therefore, if the read channel 1 signal is higher than the fixed level, i.e., the slice level, the region may be detected as the header region. And, the read channel 1 signal detected at the header region is always higher than the fixed level, a stable setting of the slice level is also made available. To do this, the LPF 301 receives the read channel 1 signal generated at the RF and servo error generator 105, removes noise therefrom by subjecting to a low pass filtering, and provides to the comparator 302. As shown in FIG. 8B, the comparator 302 generates the header mask signal representing a header region if the read channel 1 signal provided to a minus terminal thereof is higher than the slice level provided to a plus terminal thereof, and provides to the signal generator 204. In this instance, the read channel 1 signal detected at the header region is always higher than the slice level, the header region can be detected, exactly.

Figure 9:
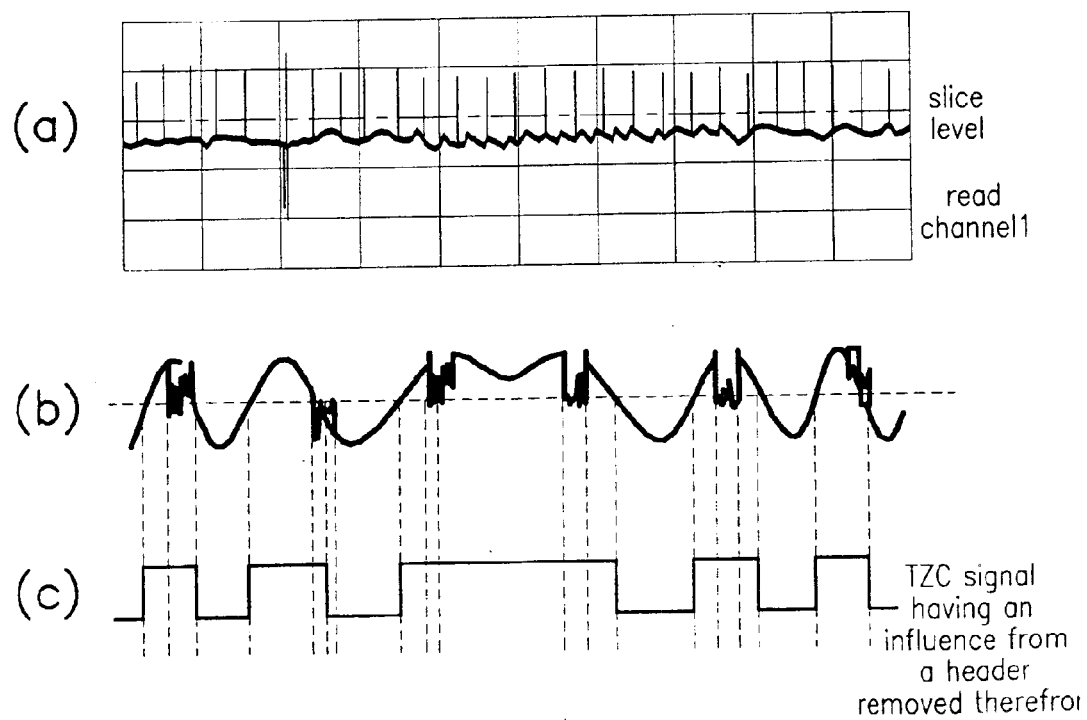
FIG. 9A illustrates a waveform of a read channel 1 signal detected at a data writable sector and head region.
FIG. 9B illustrates a waveform of a read channel 2 signal detected at a data writable sector and head region.
FIG. 9C illustrates a waveform of a TZC signal produced by slicing the read channel 2 signal in FIG. 9B at a TZC position having an influence of the header removed therefrom.

FIG. 9A illustrates a waveform of a read channel 1 signal detected at a data writable sector and head region, FIG. 9B illustrates a waveform of a read channel 2 signal detected at a data writable sector and head region, and FIG. 9C illustrates a waveform of a TZC signal produced by slicing the read channel 2 signal in FIG. 9B at a TZC position having an influence of the header removed therefrom.

Referring to FIG. 9A, the impulse type waveform higher than the slice level is the read channel 1 signal detected at the header region. That is, because a TZC signal is generated by using the read channel 2 signal as shown in FIG. 9B after the header region is detected by using the read channel 1 signal as shown in FIG. 9A, a TZC signal having an influence of the header removed therefrom can be generated as shown in FIG. 9C. Accordingly, by counting a number of pluses of the TZC signal, the optical pickup can move to a desired position in a traverse, an amount of eccentricity of the disk can be measured accurately in a free running, and the land/groove switching can be made exactly by counting the header region. And, if the read channel 1 signal is higher than a preset slice level during data writing or reading, the present point is determined to be a header region, where the servo error signal is held, for making writing of reading a data by using a stable servo.

Second Embodiment

Figure 10:
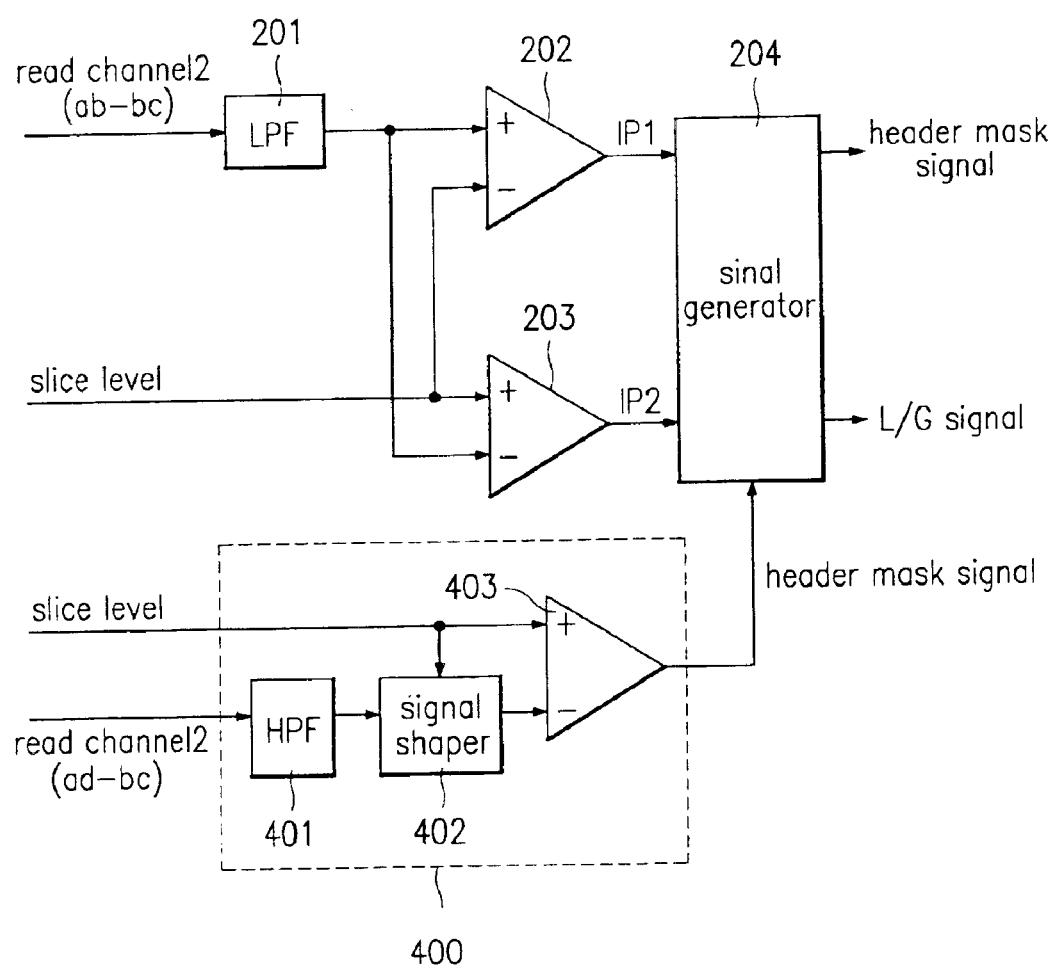
FIG. 10 illustrates a block diagram of a device for detecting a non-writable region of an optical recording medium in accordance with a second preferred embodiment of the present invention.

FIG. 10 illustrates a block diagram of a device for detecting a non-writable region of an optical recording medium in accordance with a second preferred embodiment of the present invention, which is a system shown in FIG. 4, but further including a header detector 400 for detecting a header region by using a read channel 2. The header detector 400 includes an HPF 401 for receiving the read channel 2 signal and subjecting to high pass filtering, a signal shaper 402 for shaping the high pass filtered signal, and a comparator 403 for generating a header mask signal if a signal shaped signal is higher than the preset slice level and providing to the signal generator 204.

Figure 11:
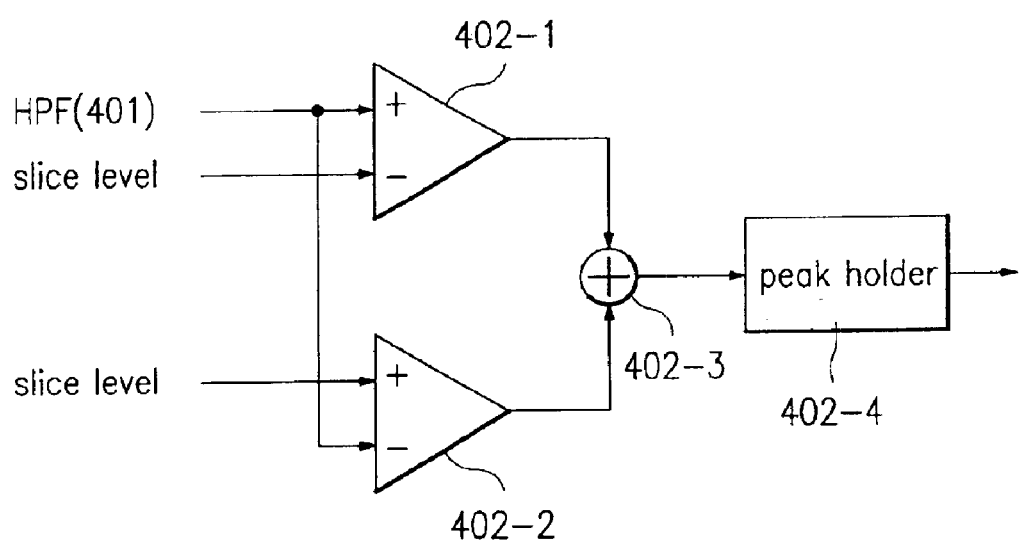
FIG. 11 illustrates a detailed block diagram of a signal shaper in FIG. 10.

The HPF 401 in the header detector 400 in accordance with a second preferred embodiment of the present invention subjects the read channel 2 signal generated at the RF and servo error generator to high pass filtering to differentiate the read channel 2, and provides to the signal shaper 402. The signal shaper 402 subjects the high pass filtered signal to peak holding, envelop detection, and LPF, to shape the signal, and provides to the comparator 403. As one embodiment, as shown in FIG. 11, the signal shaper 402 may include a first and a second comparators 402-1 and 402-2, an adder 402-3 and a peak holder 402-4. That is, the high pass filtered read channel 2 signal is sliced to respective slice levels at the first and second comparators 402-1 and 402-2 and added to the adder 402-3. In this instance, the first comparator 402-1 provides a high state signal if the read channel 2 signal to the plus terminal thereof is higher than a slice level to the minus terminal thereof, and the second comparator 402-2 provides a high state signal if the read channel 2 signal to the minus terminal thereof is higher than a slice level to the plus terminal thereof. In this instance, the slice level of the first comparator 402-1 should be higher than at least a TZC position, and the slice level of the second comparator 402-2 should be lower than at least the TZC position. And, the peak holder 402-4 peak holds an output of the adder 402-3 and provides to the comparator 403 in FIG. 10. The comparator 403 generates a header mask signal representing a header region, and provides to the signal generator 204 shown in FIG. 10, if the shaped read channel 2 signal to the minus terminal thereof is higher than the slice level to the plus terminal thereof. In this instance, as the read channel 2 signal, detected at the header region, high pass filtered and signal shaped, has a level always higher than the slice level, the header region is detected, exactly. Accordingly, by counting a number of pulses of the TZC signal, the optical pickup can move to a desired position in a traverse, and an eccentricity of the disk can be measured accurately in free running, and by counting the header regions, the land/groove switching can be made exactly. And, if the high pass filtered, and signal shaped read channel 2 signal has a level higher than the preset slice level in the middle of writing/reading a data, determining that the present point is the header region, by holding respective servo error signals at the point, the data writing/reading can be made by using stable servos.

Third Embodiment

Figure 12:
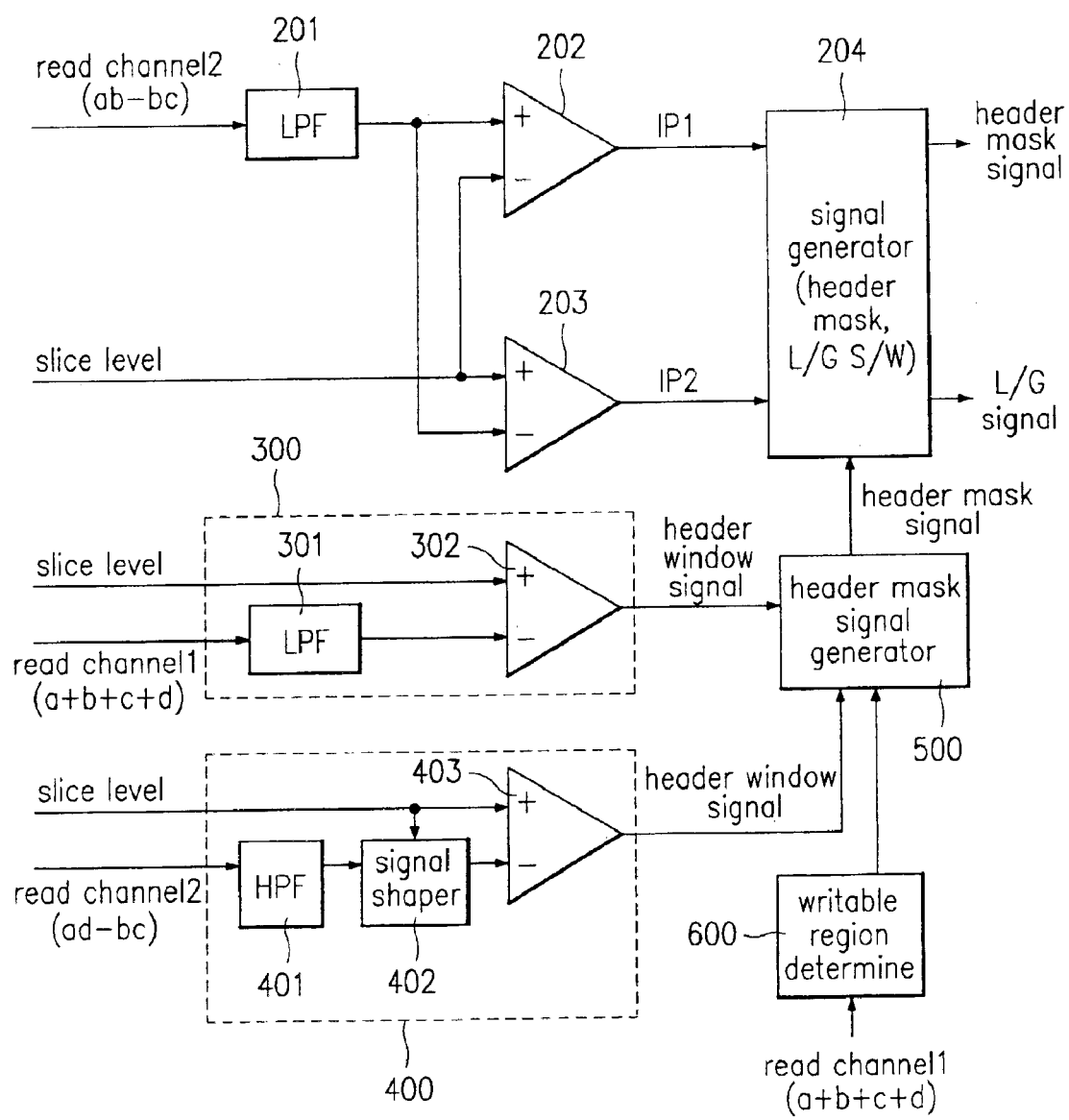
FIG. 12 illustrates a block diagram of a device for detecting a non-writable region of an optical recording medium in accordance with a third, or fourth preferred embodiment of the present invention.

FIG. 12 illustrates a block diagram of a device for detecting a non-writable region of an optical recording medium in accordance with a third preferred embodiment of the present invention. The device for detecting a non-writable region of an optical recording medium in accordance with a third preferred embodiment of the present invention further includes a first header window signal detector 300 for slicing the read channel 1 signal at a fixed slice level, to detect a first header window signal, a second header window signal detector 400 for slicing the read channel 2 signal at a fixed slice level, to detect a second header window signal, a header mask signal generator 500 for generating a header mask signal by using the first header window signal and the second header window signal, and a writable region determiner 600 for determining the present point of being a writable region by using the read channel 1 signal and providing a result of the determination to the header mask signal generator 500, in addition to a system shown in FIG. 4. The first header window signal detector 300 has a system identical to a system shown in FIG. 7 in the first embodiment, and the second header window signal detector 400 has a system identical to a system shown in FIG. 10 in the second embodiment. The slice level that slices the read channel 1 signal at the first header window signal detector 300 differ from the slice level that slices the read channel 2 signal at the second header window signal detector 400, but both of which are fixed.

A method for detecting a header region when the servo is not stable, such as in free running or traverse, will be explained in the aforementioned third embodiment of the present invention. In a regular servo, either the present invention, or the related art may be applied. In explanation of the third embodiment, it is assumed that the header mask signal is detected by the IP1 and IP2 signals generated by slicing the read channel 2 signal the same as in the related art in a regular servo, and explanation of the relevant parts(reference symbols 201,202,203, and 204 in FIG. 7) will be omitted. And, the operation of the first, and second header window signal detector 300 and 400, the header mask signal generator 500, and the writable region determiner 600 will be explained.

That is, the LPF 301 in the first header window signal detector 300 receives the read channel 1 signal from the RF and servo error generator 105, subjects to low pass filtering, to remove noise, averages, and provides to the comparator 302. The comparator 302 generates the first header window signal representing a header region and provides to the header mask signal generator 500, if a low pass filtered signal to the minus terminal thereof is higher than the slice level to the plus terminal thereof. In this instance, application of the first header window signal to the written region is efficient. That is, since the header region is a non-writable region, the header region has a reflectivity similar to the unwritten region on the disk. Accordingly, cases are occurred, in which a size of the read channel 1 signal in the unwritten region is similar to a size of the read channel 1 signal in the header region even if the read channel 1 signal is averaged by low pass filtering. Therefore, there is a high probability of misdetection that the unwritten region is detected as the header region if the header mask signal is detected by slicing the low pass filtered read channel 1 signal at the fixed slice level. On the other hand, as the written region has the data written therein, the written region has a reflectivity lower than the header region. Therefore, if the read channel 1 signal is averaged by low pass filtering, the header region in the read channel 1 signal is at a level always higher than a fixed level. Accordingly, in the written region, if the read channel 1 signal is sliced at a preset slice level, a stable detection of the header region can be made available. A method for determining the writable region/non-writable region will be explained, later.

In the meantime, the second header window signal detector 400 subjects the read channel 2 signal generated at the RF and servo error generator 105 to high pass filtering, to differentiate the read channel 2 signal, and provides to the signal shaper 402. The signal shaper 402 subjects the high pass filtered signal to peak hold, envelope detection and LPF, to shape the signal, and provides to the comparator 403. The system shown in FIG. 11 may be applied at the signal shaper 402 as it is. The comparator 403 generates the second header window signal representing the header region, and provides to the header mask signal generator 500, if the shaped read channel 2 signal to the minus terminal thereof has a level higher than the slice level to the plus terminal thereof. In this instance, application of the second header window signal to the unwritten region is efficient. Because the read channel 2 signal is difficult to slice since the read channel 2 signal detected at the written region having a RF signal loaded thereon is liable to produce differentiated noise if the read channel 2 signal is subjected to high pass filtering. That is, there is a high probability of misdetection that the written region is detected as the header region if the header mask signal is detected by slicing the high pass filtered read channel 2 signal at the fixed slice level. Accordingly, the header mask signal generator 500 selects either the first header mask signal or the second header mask signal as a final header mask signal depending on a result of the writable region determiner 600, and provides to the signal generator 204. That is, the header mask signal generator 500 provides the first header window signal as the header mask signal in the written region, and the second header window signal as the header mask signal in the unwritten region. For example, the signal generator 204 selects the header mask signal generated by using the IP1 and IP2 signals from the comparators 202 and 203 in a regular servo, and the header mask signal from the header mask signal generator 500 in a state the servo is not stable, for use in seek, L/G switching, servo error signal hold, and the like.

Figure 13:
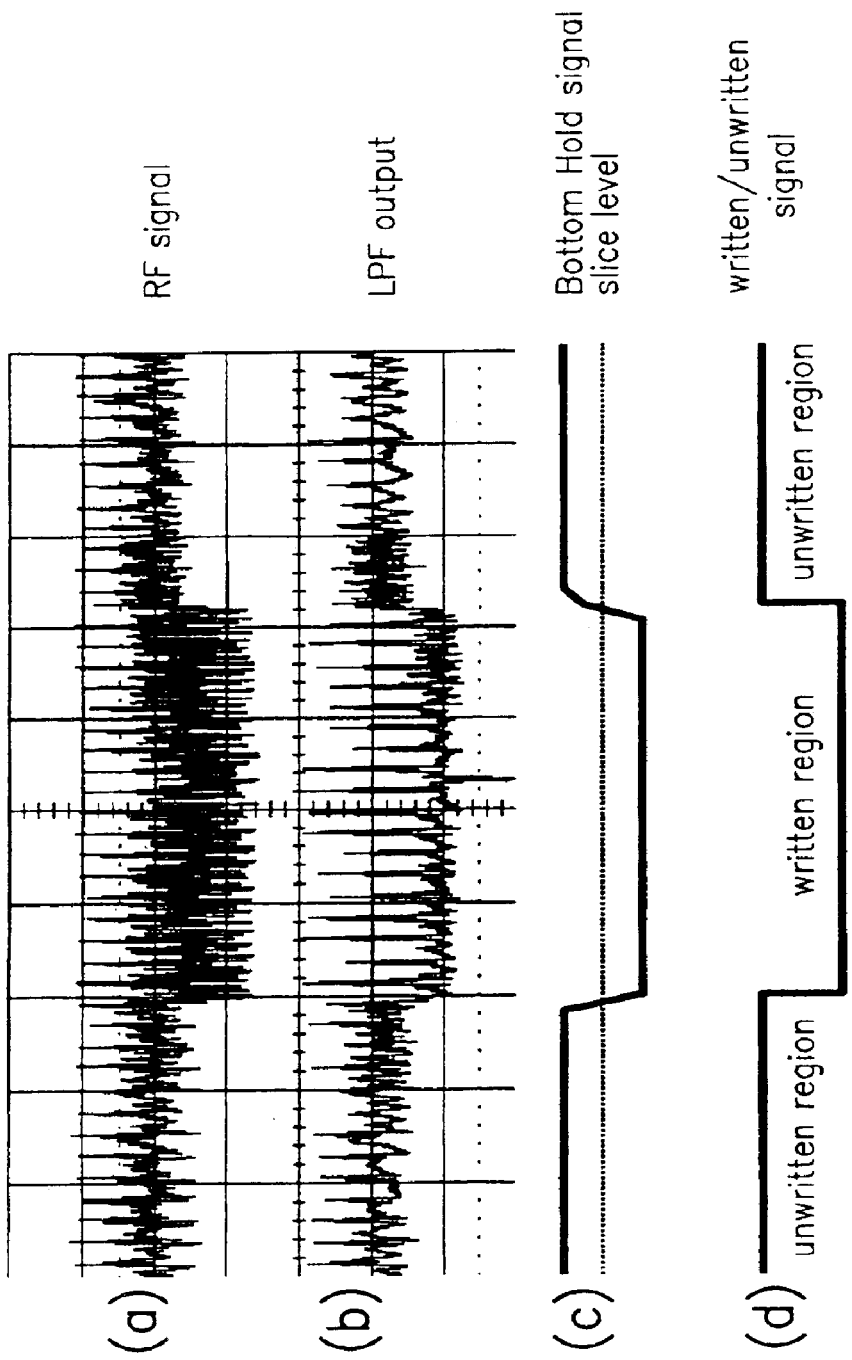
FIGS. 13A~13D illustrate a timing diagram showing a process for determining writable/non-writable regions at the writable region determining part in FIG. 12.
Figure 14:
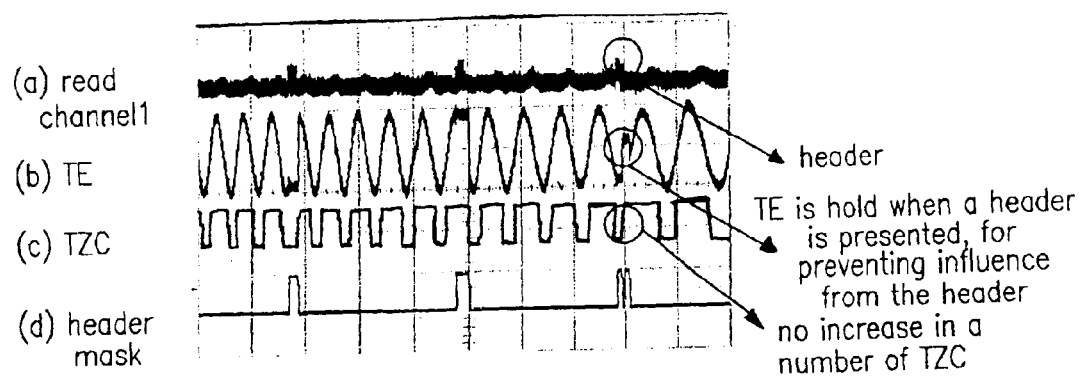
FIGS. 14A~14D illustrate a timing diagram of a read channel 1 signal detected at an unwritten region, a tracking error signal shaped by a header mask signal detected according to the present invention, a TZC signal produced by slicing the tracking error signal at a TZC position, and a header mask signal; and, FIGS. 15A~15D illustrate a timing diagram of a read channel 1 signal detected at a writable region, a tracking error signal shaped by a header mask signal detected according to the present invention, a TZC signal produced by slicing the tracking error signal at a TZC position, and a header mask signal.
Figure 15:
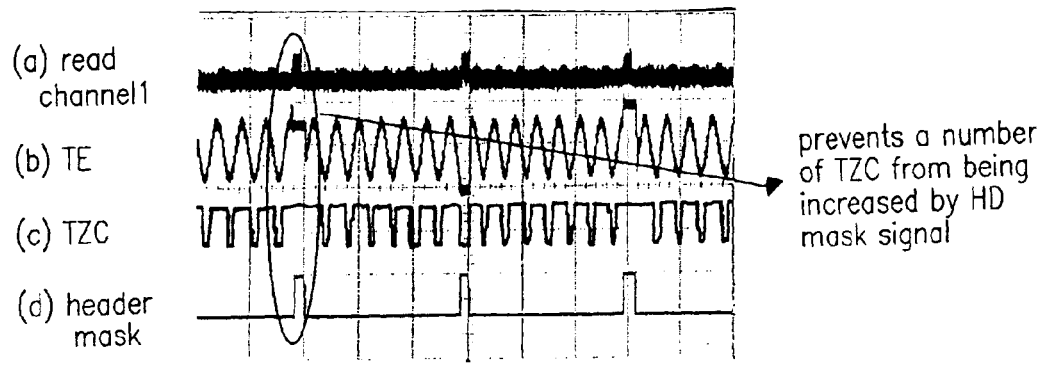

In the meantime, the writable region determiner 600 bottom holds and slices, for example, the read channel 1 signal at the slice level, for determining the present point of being a written region or unwritten region. That is, referring to the read channel 1 signal in FIG. 13A, levels of the written region, unwritten region, and the header region differ. The header and the unwritten regions have high reflectivity, and the written region has a relatively low reflectivity, which are subjected to low pass filtering, to average as shown in FIG. 13B. If a bottom of the read channel 1 signal in FIG. 13A is held, a signal as shown in FIG. 13C is provided, and if the signal as shown in FIG. 13C is sliced at an appropriate level, a written/unwritten region determining signal as shown in FIG. 13D can be produced. That is, as shown in FIG. 13, the writable region determiner 600 provides a high state signal, if the bottom held read channel 1 signal is higher than the slice level, and a low state signal, if the bottom held read channel 1 signal is lower than the slice level, to the header mask signal generator 500. Then, the header mask signal generator 500 provides the first header window signal as the header mask signal, determining that the present point is the written region if the low state signal is received, and provides the second header window signal as the header mask signal, determining that the present point is the unwritten region if the high state signal is received.

Fourth Embodiment

In the meantime, if the slice level is changed in producing the header mask signal, the header mask signal can be applied both to the written/unwritten region. Therefore, in the fourth embodiment, the header mask signal detected by slicing the read channel 1 signal or the read channel 2 signal at an adjusted slice level can be applied both to the written region and the unwritten region. And, the header mask signals detected by slicing the read channel 1 signal and the read channel 2 signal at respective adjusted slice levels can be compensated for each other, for application both to the written region and the unwritten region. The fourth embodiment of the present invention may be carried out by using one system selected from systems shown in FIGS. 7, 10, and 12 shown for explaining the first to third embodiments. Herein, the system in FIG. 12 will be used for convenience.

That is, provided that the header mask signal is produced by changing the slice level to the LPF 301 in the first header window signal detector 300, and slicing the low pass filtered read channel 1 signal at the changed slice level, the header mask signal is applicable regardless of the written/unwritten regions. In this instance, the slice level for slicing the read channel 1 signal should be higher than the fixed slice level in the third embodiment, to an extent no error is detected. If the second header window signal produced by slicing the read channel 2 signal at the fixed slice level is used in compensating of the header mask signal, a more stable header mask signal can be detected. That is, if the header window signal produced by slicing the read channel 1 signal at the changed slice level and the second header window signal detected by slicing the read channel 2 signal at the fixed slice level are subjected to ORing, detection of the header region becomes more accurate. On the other hand, if the header mask signal is produced by changing the slice level to the HPF 401 in the second header window signal detector 400, and slicing the high pass filtered, and signal shaped read channel 2 signal at the changed slice level, the header mask signal is applicable both to the written region/ unwritten region. In this instance too, the slice level at which the read channel 2 signal is sliced should be higher than the fixed slice level in the third embodiment, to an extent no error is detected. A likely, when the header mask signal is compensated by using the first header window signal produced by slicing the read channel 1 signal at the fixed slice level in the third embodiment, a more stable header mask signal can be detected. That is, the third embodiment is effective in a case the fixed slice level is used in detection of the header region, and the fourth embodiment is effective if the changed slice level is used.

FIGS. 14A~14D illustrate a timing diagram of a read channel 1 signal detected at an unwritten region, a tracking error signal shaped by a header mask signal detected according to the present invention, a TZC signal produced by slicing the tracking error signal at a TZC position, and a header mask signal in an order. That is, since the tracking error signal is held exactly at the header region by the header mask signal detected in the present invention, the tracking error signal is not affected by the header. Therefore, it can be known that a number of the TZC is not increased.

FIGS. 15A~15D illustrate a timing diagram of a read channel 1 signal detected at a written region, a tracking error signal shaped by a header mask signal detected according to the present invention, a TZC signal produced by slicing the tracking error signal at a TZC position, and a header mask signal in the order. A likely, in this instance too, it can be known that a number of the TZC is not increased by the header mask signal detected in the present invention. Accordingly, by counting the number of pulses of the TZC signal, the optical pickup can be moved to a desired position in a traverse, and an eccentricity of the disk can be measured accurately in free running, and exact land/groove switching can be made by counting the header region.

As has been explained, in the device and method for detecting a non-writable region of an optical recording medium, by producing header mask signals by slicing the read channel 1 signal and the read channel 2 signal at respective slice levels, and by determining a header region, a non-writable region, from the header mask signal considering the slice levels and the written/unwritten regions on the disk detection of the header region becomes exact and easy even if in a non-regular case when the servos are not stable, that provides the following advantages.

First, the holding of the servo error signal, such as the tracking error signal, and the focus error signal, leads to stabilization of the servos, that prevents deterioration of data quality in writing and reading the data.

Second, the no influence of the header to the measurement of the disk eccentricity permits to an exact measurement of the eccentricity.

Third, the shifting of the optical pickup to a desired position permitted during a seek, such as track jump, can prevent slow down of the seek and the servos become unstable.

Fourth, the ability of exact detection of the header region permits to avoid the header region in tracking servo on in a seek.

Fifth, the exact detection of the header region, and the header region counting and the exact land/groove region determination made available from the exact header region detection permits stable and exact switching of the land/ groove.

It will be apparent to those skilled in the art that various modifications and variations can be made in device and method for detecting a non-writable region of an optical recording medium of the present invention without departing from the spirit or scope of the invention. Thus, it is intended that the present invention cover the modifications and variations of this invention provided they come within the scope of the appended claims and their equivalents.

What is claimed is:

1. A method for detecting a non-writable region of an optical recording medium including a plurality of non-writable regions of different phases having information for controlling a writable data region between the writable data regions, the method comprising the steps of:

(1) detecting a sum of optical signals reflected at the optical recording medium;

(2) comparing the summed signal to a reference value; and (3) determining if a current position is a writable region or a non-writable region based on the result of the comparison.

2. The method as claimed in claim 1, wherein step (3) determines that the current position is a non-writable region if the summed signal is higher than the reference value.

3. The method as claimed in claim 1, wherein the non-writable region is a header region.

4. The method as claimed in claim 1, wherein step (1) includes a step of obtaining at least a bottom hold signal from the summed signal.

5. The method as claimed in claim 4, wherein step (3) determines the present region as an non-writable region if the bottom held value is greater than a reference value, and as a writable region if the bottom held value is smaller than the reference value.

6. The method as claimed in claim 1, further comprising holding a servo error signal for carrying out a servo control to read or write data if the current position is determined as a non-writable region.

7. The method as claimed in claim 1, further comprising:

counting a number of the determined non-writable regions, to determine the present track of being a land track or a groove track, and performing a land/groove switching operation depending on a result of the determination.

8. A method for detecting a non-writable region of an optical recording medium including a plurality of non-writable regions of different phases having information for controlling a writable data region between the writable data regions, the method comprising the steps of:

(1) detecting a read channel 1 signal being an added signal of optical signals reflected at the optical recording medium;

(2) comparing the read channel 1 signal to a reference value; and (3) discriminating a writable region or a non-writable region based on a result of the comparison.

9. The method as claimed in claim 8, wherein step (1) includes a step of detecting a read channel 2 signal being a difference signal of optical signals reflected from the optical recording medium.

10. The method as claimed in claim 9, wherein step (2) compares the detected signal with a reference value, thereby to determine a region as the non-writable region based on a result of the comparison.

11. A method for detecting a non-writable region of an optical recording medium, the method comprising the steps of:

(1) detecting a read channel 2 signal being a difference of optical signals reflected from the optical recording medium, the optical recording medium includes a plurality of non-writable regions of different phases having information for controlling a writable data region between the writable data regions;

(2) comparing the detected signal with a reference value; and (3) determining a region as the non-writable region or the writable region based on a result of the comparison.

12. The method as claimed in claim 11, wherein step (1) includes a step of detecting a read channel 1 signal being a summation of optical signals reflected from the optical recording medium.

13. The method as claimed in claim 12, wherein step (2) compares the detected signal with a reference value, thereby to determine a region as the non-writable region based on a result of the comparison.

14. The method as claimed in claim 11, further comprising:

(4) holding a servo error signal for a servo control if a point of the optical recording medium being written or read at the present time is determined to be a non-writable region.

15. The method as claimed in claim 11, further comprising:

(4) counting a number of the determined non-writable regions, to determine the present track of being a land track or a groove track, and (5) performing a land/groove switching operation depending on a result of the determination.

16. The method as claimed in claim 11, wherein step (1) includes a step of obtaining at least a bottom hold signal from the summed signal.

17. The method as claimed in claim 16, wherein step (3) determines the present region as the non-writable region or the writable region as comparing the bottom held value with the reference value.

18. The method as claimed in claim 17, wherein step (3) determines the present region as the non-writable region if the bottom held value is greater than the reference value, and as the writable region if the bottom held value is smaller than the reference value.

19. A method for detecting a non-writable region of an optical recording medium, the method comprising the steps of:

detecting a non-writable region of an optical recording medium, by comparing a read channel 1 or a read channel 2 signal with a reference value, the read channel 2 signal being a difference of optical signals reflected from the optical recording medium, and the read channel 1 signal being a summation of optical signals reflected from the optical recording medium; and controlling a read or write operation based on the result of the detection step.

20. The method as claimed in claim 19, further comprising the step of changing the reference value be to compared with a read channel 1 or a read channel 2 signal, thereby to detect a non-writable region of an optical recording medium.

21. The method as claimed in claim 20, further comprising the step of determining a region as the non-writable region if a low pass filtered value is greater than the changed reference value.

* * * * *